United States Patent
Zheng et al.

(10) Patent No.: US 8,248,780 B2
(45) Date of Patent: Aug. 21, 2012

(54) ALL-IN-ONE COMPUTER

(75) Inventors: Jun-Jie Zheng, Shenzhen (CN); Yan Zhong, Shenzhen (CN); Xin Ji, Shenzhen (CN); Wen-Hsiang Hung, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 219 days.

(21) Appl. No.: 12/787,826

(22) Filed: May 26, 2010

(65) Prior Publication Data
US 2011/0216493 A1   Sep. 8, 2011

(30) Foreign Application Priority Data

Mar. 5, 2010   (CN) .......................... 2010 1 0118623

(51) Int. Cl.
*H05K 7/20* (2006.01)
*A47B 81/00* (2006.01)
*F28F 7/00* (2006.01)

(52) U.S. Cl. .............. 361/679.47; 361/679.48; 361/709; 361/695; 312/223.2; 248/919; 165/80.3

(58) Field of Classification Search .......... 361/679.01–679.02, 679.21–679.22, 361/679.46–679.48, 679.52, 679.6, 700, 361/695, 697; 312/223.2; 165/80.3–80.5, 165/104.33, 185; 257/715, E23.088
See application file for complete search history.

(56) References Cited

U.S. PATENT DOCUMENTS

| | | | |
|---|---|---|---|
| 6,032,918 A * | 3/2000 | Cho ............................. | 248/688 |
| 6,366,452 B1 * | 4/2002 | Wang et al. ............. | 361/679.22 |
| 7,145,767 B2 * | 12/2006 | Mache et al. ........... | 361/679.21 |
| 7,433,185 B1 * | 10/2008 | Curran et al. ........... | 361/679.41 |
| 2005/0036283 A1 * | 2/2005 | Hillman et al. ............... | 361/683 |
| 2006/0198097 A1 * | 9/2006 | Kuwajima et al. ........... | 361/685 |
| 2007/0097609 A1 * | 5/2007 | Moscovitch ................. | 361/681 |
| 2008/0024971 A1 * | 1/2008 | Jackson, Jr. .................. | 361/683 |
| 2010/0321865 A1 * | 12/2010 | Huang et al. ............. | 361/679.01 |

* cited by examiner

*Primary Examiner* — Zachary M Pape
(74) *Attorney, Agent, or Firm* — Altis Law Group, Inc.

(57) ABSTRACT

An all-in-one computer includes a monitor, a motherboard, a power supply, and a support mechanism supporting the monitor. The support mechanism includes a base, and a support stand fixed on the base and connected to the monitor. The support stand defines a cavity to receive the motherboard and the power supply. The motherboard and the power supply are electrically connected to the monitor.

16 Claims, 3 Drawing Sheets

ALL-IN-ONE COMPUTER

BACKGROUND

1. Technical Field

The present disclosure relates generally to all-in-one computers, particularly, to an all-in-one computer utilizing a support mechanism.

2. Description of Related Art

As is well known, personal computers provide a wide variety of physical shapes and configurations ranging from a notebook computer, which compactly packages a keyboard, several operating electronics and a monitor into a single portable package, to a desktop computer which may include separate computer, monitor, keyboard and speaker components gathered together with other separate computing accessories. Generally occupying a middle ground between these two computer systems is a personal computer platform/structure commonly referred to as an all-in-one computer. In the all-in-one computer, although a separate keyboard is required, the monitor and other electronic components, such as a motherboard, a hard disk, a power supply, or the like are assembled in a single housing structure.

However, in a conventional all-in-one computer, the overall thickness of the monitor is increased, since all of the electronic components are positioned on a rear side of the monitor.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the views.

DETAILED DESCRIPTION

Figure 1:
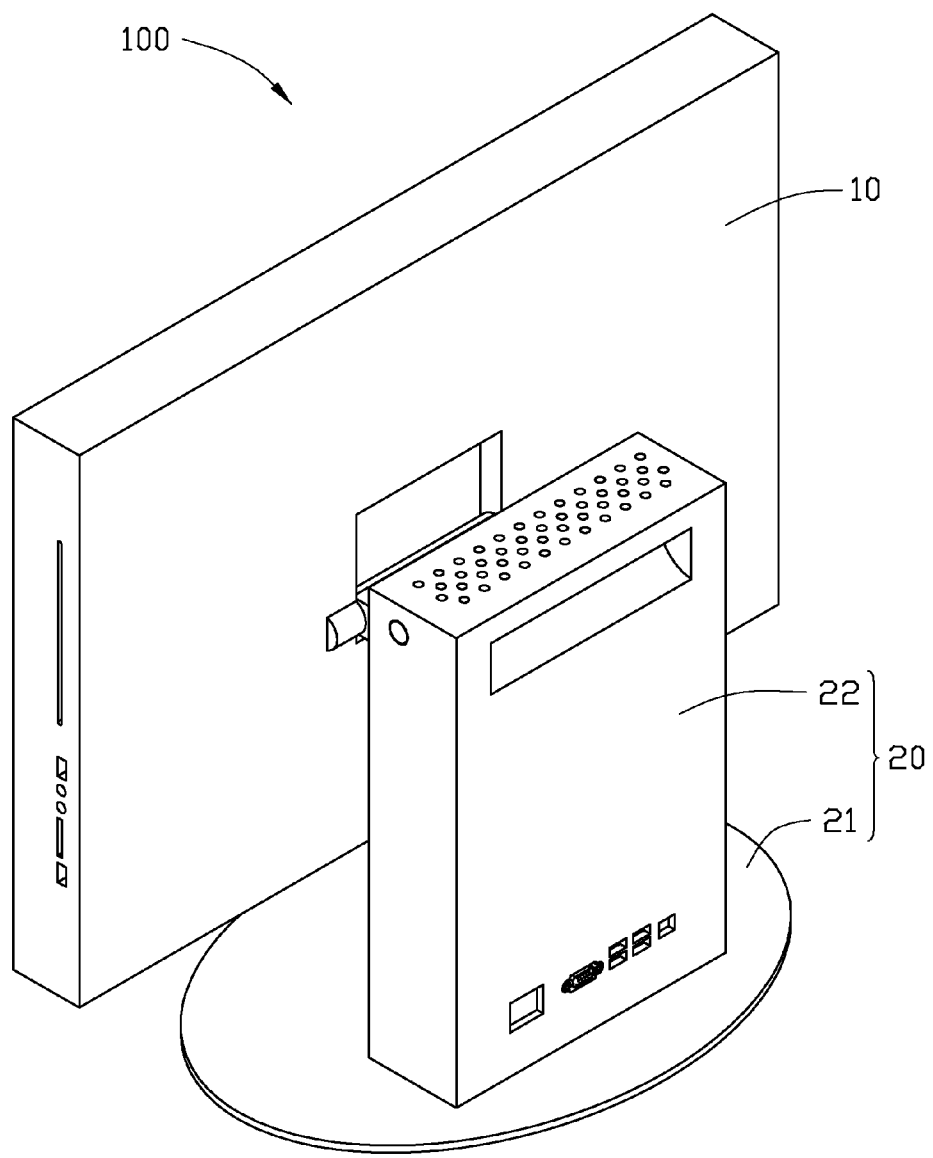
FIG. 1 is an assembled, isometric view of an embodiment of an all-in-one computer.

Referring to FIG. 1, an embodiment of an all-in-one computer 100 includes a monitor 10, and a support mechanism 20 supporting the monitor 10. The support mechanism 20 includes a base 21 and a support stand 22 fixed on the base 21.

Figure 2:
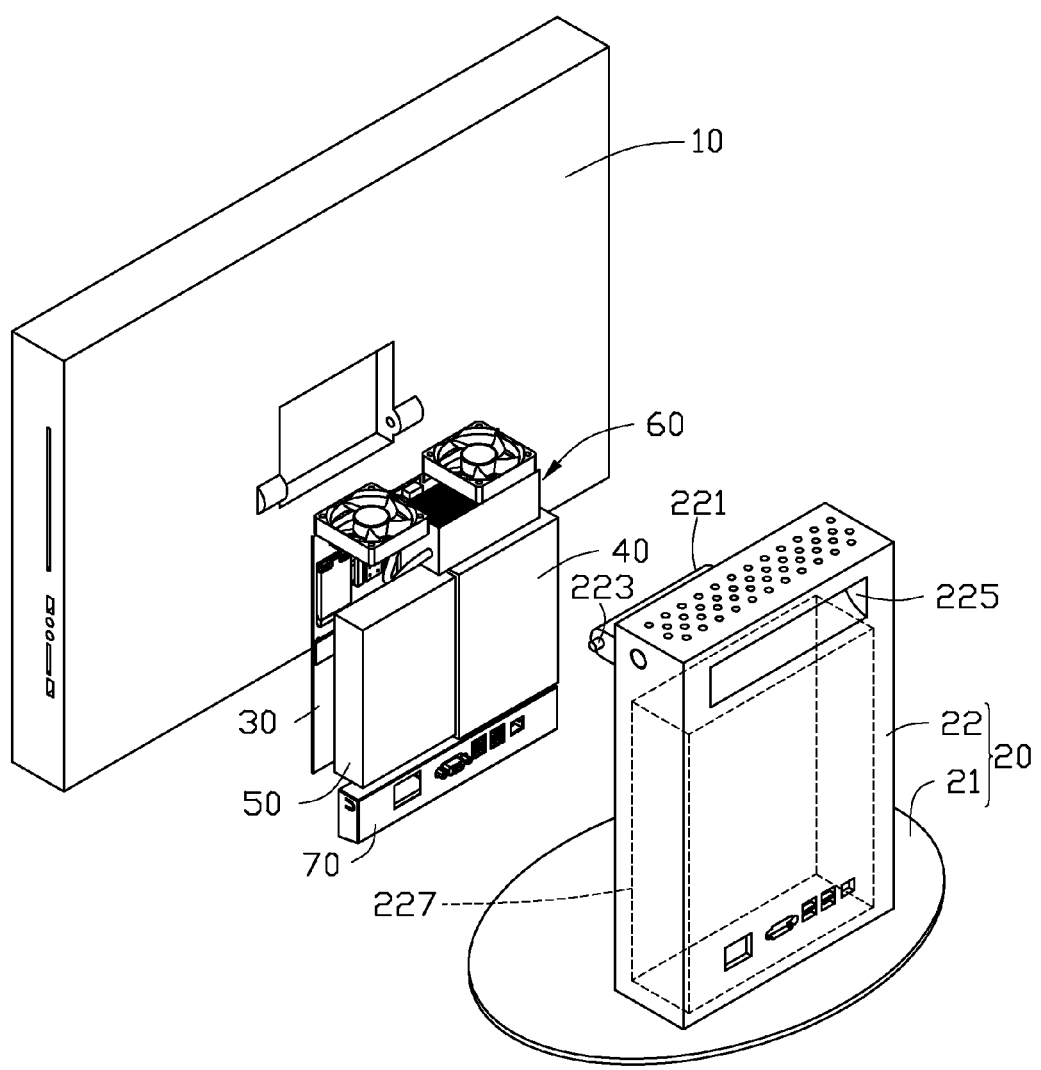
FIG. 2 is a partial, exploded, isometric view of the all-in-one computer of FIG. 1.

Referring to FIG. 2, the support stand 22 is a substantially hollow rectangular cube made of metal, which can provide electromagnetic interference (EMI) shielding capability and improves its mechanical strength. The support stand 22 includes a connecting portion 221 extending from a top portion of a side of the support stand 22 facing the monitor 10. The all-in-one computer 100 further includes a hinge assembly 223 coupled between the connecting portion 221 and the monitor 10. Thus, a viewing angle of the monitor 10 is adjustable relative to the support stand 22, so that user can view a screen of the monitor 10 from different positions. The support stand 22 defines a handle portion 225 on a side thereof to provide ease of transport. The handle portion 225 is in the form of a depression towards the interior of the support stand 22. The support stand 22 further defines a substantially rectangular cavity 227 inside the support stand 22. The all-in-one computer 100 further includes a motherboard 30, a hard disk 40, a power supply 50, a heat sink module 60, and a first peripheral interface module 70 received inside the cavity 227.

Figure 3:
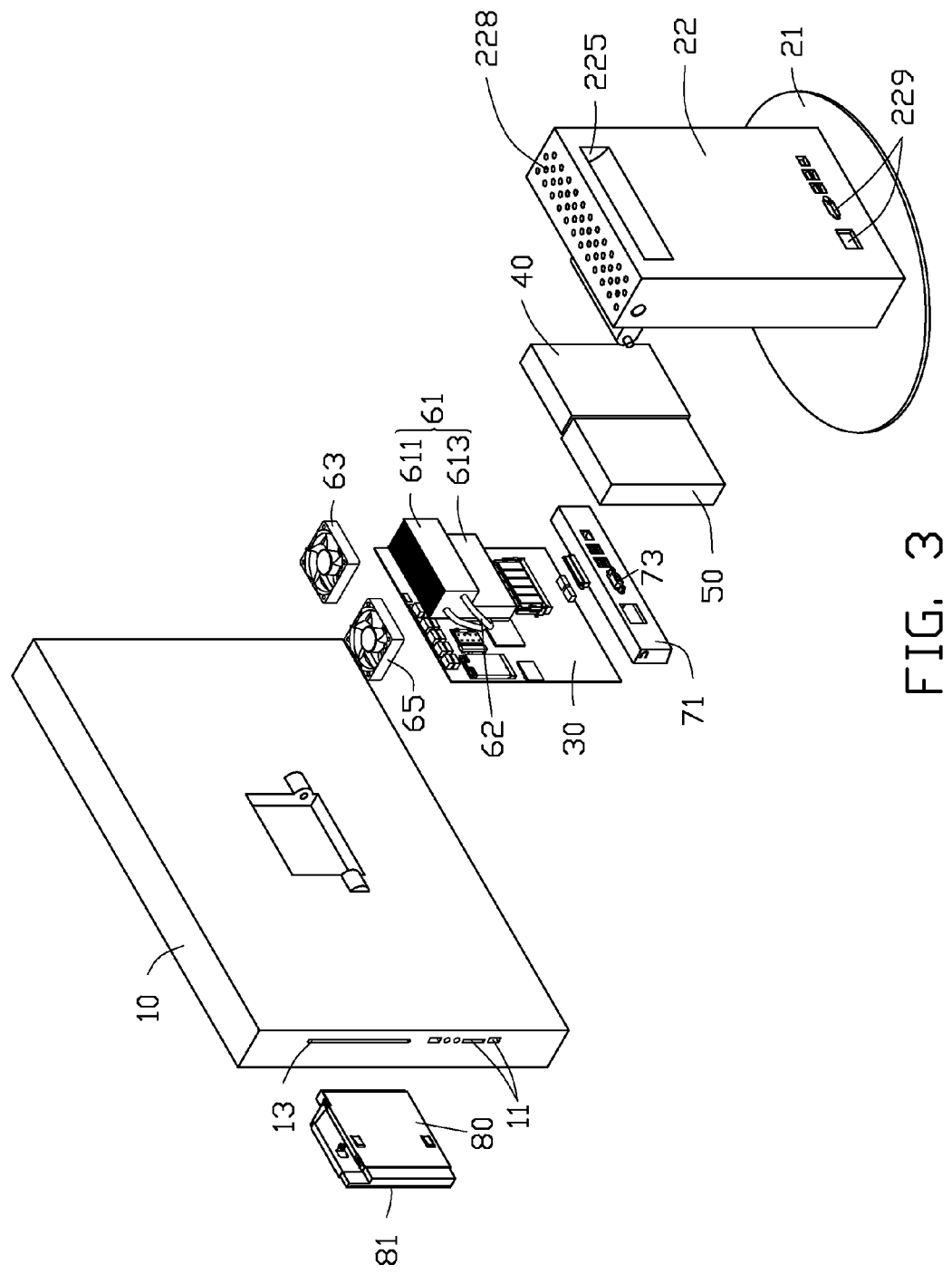
FIG. 3 is another partial, exploded, isometric view of the all-in-one computer of FIG. 1.

Referring also to FIG. 3, the motherboard 30 may be a standard balanced technology extended (BTX) motherboard. The all-in-one computer 100 further includes a central processing unit (CPU), a memory chip (not labeled) coupled on the motherboard 30. The monitor 10, the hard disk 40, the power supply 50, the heat sink module 60, and the first peripheral interface module 70 are correspondingly electrically connected to the motherboard 30. In an alternative embodiment, in order to conserve space of the cavity 227, the motherboard 30 may be a Micro-BTX motherboard or a notebook motherboard having a high level of integration.

The hard disk 40, substantially rectangular, may be a standard integrated device electronics (IDE) hard disk, or a serial advanced technology attachment (SATA) hard disk. The hard disk 40 is positioned close to a side of the motherboard 30 and parallel to the motherboard 30.

The power supply 50 has the same shape as the hard disk 40, and it is aligned side by side with the hard disk 40 parallel to the motherboard 30. The power supply 50 is arranged in such a way to maximize use of the cavity 227 and to decrease the thickness of the support stand 22.

The heat sink module 60 includes a heat sink 61, a first fan 63, and a second fan 65. The heat sink 61 is positioned on the motherboard 30 and contacts the CPU. In the illustrated embodiment, the heat sink 61 is a fin-type heat sink and includes a substantially rectangular first dissipating portion 611, a second dissipating portion 613 extending from a side of the first dissipating portion 611, and two heat pipes 62 connecting the first dissipating portion 611 and the second dissipating portion 613. The first dissipating portion 611 is positioned on a side of the hard disk 40, and the second dissipating portion 613 is positioned between the motherboard 30 and the hard disk 40 while contacting both. The first fan 63 is located at an upper portion of the cavity 227, and it is mounted on the first dissipating portion 61. The second fan 65 is adjacent to the first fan 63 facing the power supply 50.

In use, airflow generated by the first fan 63 passes through the heat sink 61, to dissipate heat generated by the CPU and the hard disk 40. Airflow generated by the second fan 65 passes through the power supply 50, to dissipate heat generated by the power supply 50. In order to improve the heat dissipation efficiency of the heat sink module 60, the support stand 22 defines a plurality of vents 228 on a top surface thereof communicating with the cavity 227 and corresponding to the first fan 63 and the second fan 65.

The first peripheral interface module 70 includes a fixing plate 71 and a plurality of peripheral interfaces 73, such as a video graphic array (VGA) port, an universal serial bus (USB) port, a local area network (LAN) port, located on the fixing plate 71. The support stand 22 defines a plurality of through holes 229 corresponding to the peripheral interfaces 73.

The all-in-one computer 100 further includes a second peripheral interface module (not shown) located inside the monitor 10 electrically connected to the motherboard 30. The second peripheral interface module may include a plurality of peripheral interfaces (not shown), such as an audio output port, USB port, and an expansion card port. The monitor 10 defines a plurality of through holes 11 corresponding to the peripheral interfaces.

The all-in-one computer 100 further includes an optical disc driver 80 located inside the monitor 10 and electrically connected to the motherboard 30. In the illustrated embodiment, the optical disc driver 80 is a slot-in type optical disc driver and defines a slot 81 receiving a disc on a side. The monitor 10 defines an opening 13 corresponding to the slot 81.

In the all-in-one computer 100, the motherboard 30, the hard disk 40, and the power supply 50 are received in the support stand 22, such that the monitor 10 provides reduced thickness and number of components. In addition, an improved EMI shielding effect of the monitor 10 can be achieved, because the motherboard 30 and the hard disk 40 are separate from the monitor 10. Furthermore, the all-in-one computer 100 according to the present disclosure can simplify the replacement procedure of the hard disk 40 or the power supply 50, raising production efficiency and reducing cost.

It is to be understood that first peripheral interface module 70, the second peripheral interface module, the optical disc driver 80, and the heat sink module 60 may be omitted.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An all-in-one computer, comprising:
    a monitor;
    a motherboard;
    a power supply; and
    a support mechanism supporting the monitor, the support mechanism comprising:
        a base;
        a support stand fixed on the base and connected to the monitor, and the support stand defining a cavity to receive the motherboard and the power supply, wherein the motherboard and the power supply are electrically connected to the monitor;
    a hard disk received in the cavity and electrically connected to the motherboard; and
    a heat sink module received in the cavity, and the heat sink module comprising a heat sink positioned on the motherboard and a first fan mounted on the heat sink; wherein, the heat sink comprises a first dissipating portion positioned on a side of the hard disk, and a second dissipating portion is positioned between the motherboard and the hard disk and is connected to the first dissipating portion.

2. The all-in-one computer of claim 1, wherein the hard disk and the power supply are parallel to the motherboard and aligned side by side.

3. The all-in-one computer of claim 1, wherein the support stand defines a plurality of vents communicating with the cavity on a top surface thereof.

4. The all-in-one computer of claim 3, wherein the first fan is located at an upper portion of the cavity.

5. The all-in-one computer of claim 1, further comprising a second fan adjacent to the first fan to provide airflow for the power supply.

6. The all-in-one computer of claim 1, further comprising a first peripheral interface module received in the cavity and electrically connected to the motherboard.

7. The all-in-one computer of claim 6, wherein the support stand defines a through hole communicating with the cavity corresponding to the first peripheral interface module.

8. The all-in-one computer of claim 1, further comprising an optical disc driver located inside the monitor, and electrically connected to the motherboard.

9. The all-in-one computer of claim 8, wherein the monitor defines an opening corresponding to the optical disc driver.

10. The all-in-one computer of claim 9, wherein the optical disc driver is a slot-in type optical disc driver.

11. The all-in-one computer of claim 1, further comprising a hinge assembly coupled between the monitor and the support mechanism.

12. A computer, comprising:
    a support mechanism supporting a monitor, the support mechanism comprising:
        a base; and
        a support stand fixed on the base and connected to the monitor, and the support stand defining a cavity to receive a motherboard and a power supply, wherein the motherboard and the power supply are electrically connected to the monitor;
    a hard disk received in the cavity and electrically connected to the motherboard; and
    a heat sink module received in the cavity, and the heat sink module comprising a heat sink positioned on the motherboard; wherein, the heat sink comprises a first dissipating portion positioned on a side of the hard disk, and a second dissipating portion is positioned between the motherboard and the hard disk and is connected to the first dissipating portion.

13. The computer of claim 12, wherein the hard disk and the power supply are parallel to the motherboard and aligned side by side.

14. The computer of claim 12, wherein the heat sink module comprises a first fan mounting on the heat sink.

15. The computer of claim 14, wherein the support stand defines a plurality of vents communicating with the cavity on a top surface thereof.

16. The computer of claim 15, wherein the first fan is located at an upper portion of the cavity.

* * * * *